Patented Oct. 18, 1949

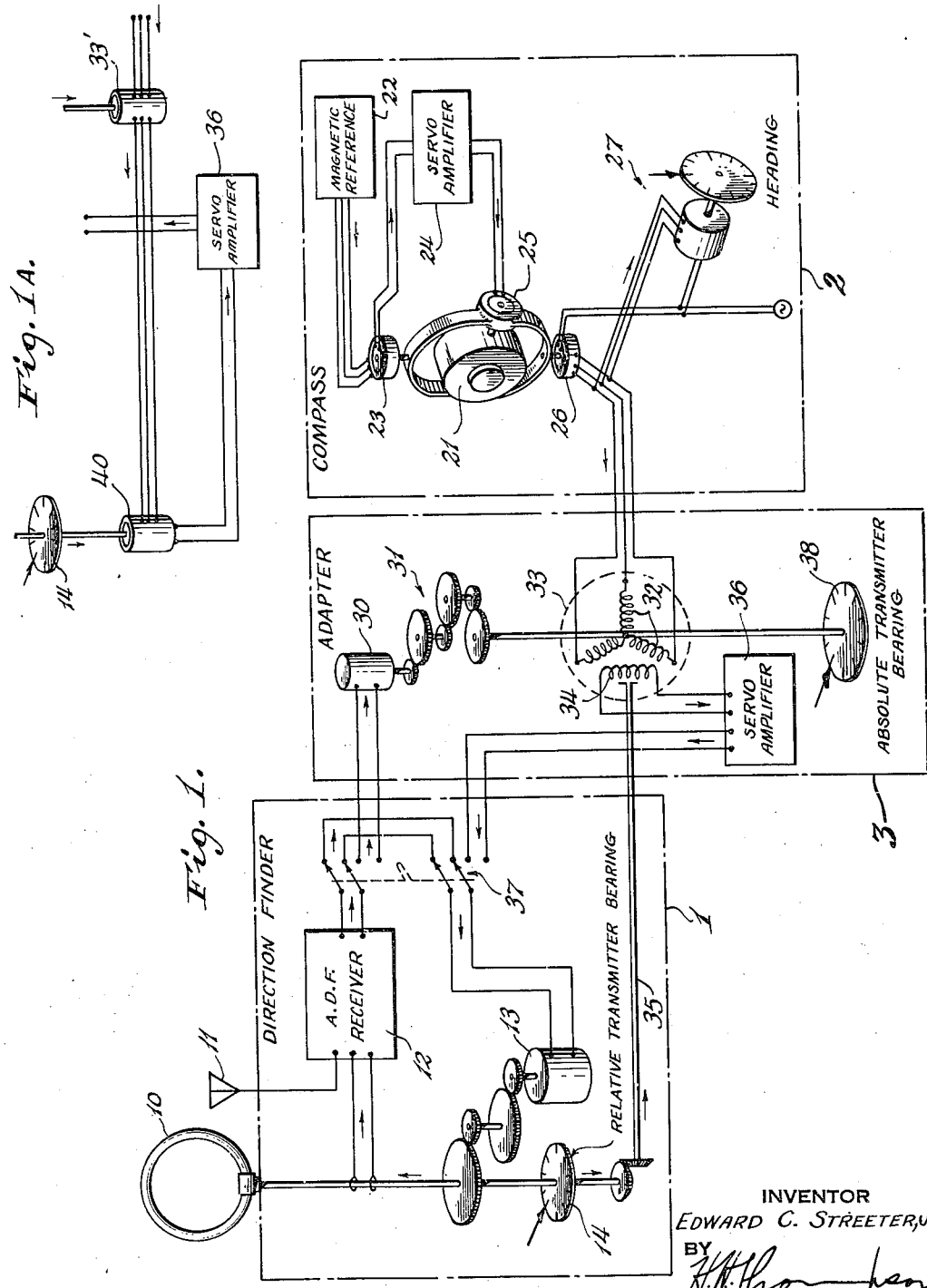

2,484,862

UNITED STATES PATENT OFFICE 2,484,862

COMPASS STABILIZED DIRECTION FINDER

Edward C. Streeter, Jr., New York, N. Y., assignor to The Sperry Corporation, a corporation of Delaware Application February 18, 1948, Serial No. 9,265

14 Claims. (Cl. 343—117)

This invention relates to radio navigation and more particularly to stabilized automatic radio direction finding apparatus adapted to be mounted on a mobile craft.

Application Serial No. 706,337 entitled "Radio navigation systems" in the name of Thomas M. Ferrill, Jr., discloses means to stabilize directional radio apparatus in azimuth, and to gradually change the orientation thereof in response to integrated information from the radio directional means. According to one embodiment in the Ferrill application, the direction finder apparatus is stabilized by a directional gyroscope which is adapted to be precessed by directional error signals from the D. F. receiver. The inertia of the gyroscope has an averaging or integrating effect on these signals thereby rendering them insensitive to momentary variations.

Previously, non-stabilized automatic direction finder apparatus has been responsive to momentary, erratic changes in apparent radio directions, such as those caused by interference, static, signal fading, reflections and quadrantal error caused by bank of the craft. These erratic fluctuations cause hunting of the automatic direction finder apparatus and generally impair its effectiveness.

The present application provides improvements in automatic direction finder apparatus of the stabilized type, by utilizing the existing craft compass to stabilize the directional radio means in azimuth, by the use of novel interconnecting means between the automatic direction finder and the craft compass. This eliminates the need for a separate gyroscope in addition to that already contained in an existing craft compass system, particularly one with gyro stabilization.

Accordingly an object of the present invention is to provide a simple and inexpensive form of data smoothing device in stabilized direction finding apparatus.

Another object of the invention is to provide stabilized directional radio means utilizing the existing craft compass system.

Another object is to provide a simple and inexpensive adapter unit to interconnect existing direction finder means and craft compass, to thereby stabilize the direction finder means in azimuth.

Another object is to interconnect existing craft directional radio means and compass to thereby stabilize and integrate the operation of the former.

Another object of the invention is to provide automatic direction finder apparatus stabilized in azimuth, by the existing craft compass, and responsive to integrated signals from its directional receiver to gradually correct its azimuth.

These and other objects will be apparent from the following specification taken in conjunction with Fig. 1, which is a schematic diagram of a preferred embodiment of the invention, and Fig. 1A which is a similar diagram showing a modification.

Fig. 1 illustrates a preferable embodiment of the invention comprising a conventional automatic direction finder 1, a conventional gyro-magnetic compass 2, both of which are standard equipment on practically all types of craft and an adapter 3. As will be explained, adapter 3 contains apparatus interconnecting the two conventional existing pieces of navigation equipment, thereby improving the D. F. system performance according to the teaching of the invention.

Automatic radio direction finder 1 comprises a directional antenna 10, non-directional antenna 11, receiver 12, antenna drive motor 13, and indicator 14. The automatic direction finder receiver 12 provides an output signal to motor 13, through the upper position of switch 37, which rotates the directional antenna 10 into coincidence with the direction of received energy according to well-known principles, and the indicator 14, mounted on the shaft of directional antenna 10 indicates relative transmitter bearing.

The compass unit 2 is illustrated as a conventional gyro-magnetic compass system, such as a Gyrosyn shown in Patent No. 2,383,461 to Esval et al., dated August 28, 1945 for Flux valve compass system, comprising a gyroscope 21 which is slaved to a compass or other magnetic reference 22 through Selsyn 23 which is adapted to generate an error signal, when the gyro departs from the compass in azimuth, thereby energizing servo amplifier 24 the output of which causes the gyroscope 21 to precess into alignment with the compass 22 or other magnetic reference by means of the torque motor 25. Selsyn 26 on the vertical shaft of gyroscope 21 provides "heading" information to repeater 27. Any compass providing stable "heading" information, and capable of transmitting such information to a repeater may be substituted for the illustrated gyro-magnetic compass 2.

The adapter 3 comprises motor 30, the output shaft of which is connected through gear train 31 to the shaft of the rotatable three phase winding 32 of transformer 33. The rotatable single phase winding 34 of transformer 33 is mechanically connected by shaft 35 to the directional antenna 10. The electrical output of single phase winding 34 is connected to servo amplifier 36, the output of which is connected to motor 13 through the lower position of switch 37. It will be shown that indicator 38, which is connected to the shaft of three phase winding 32, provides an indication of "absolute transmitter bearing."

The operation of adapter unit 3 in conjunction with the other existing units is as follows. Three phase winding 32 of transformer 33 is energized by "heading" information signals provided by compass 2. Motor 30 is energized through the lower position of switch 37 by direction finder receiver 12, proportionally to the deviation between the direction of directional antenna 10 and the direction of received energy. The output shaft of motor 30 rotates three phase winding 32 through the high ratio gear train 31, which operates as an integrating means. In other words, the effect of gear train 31 is to average the signal output of receiver 12. The output single phase winding 34 will then be energized by a signal which is the resultant of three factors, namely:

(1) the position of three phase winding 32;
(2) the electrical "heading" signal on that winding provided by compass 2; and
(3) the position of the single phase winding 34 "relative bearing" which is mechanically connected to the shaft of directional antenna 10.

The fundamental equation of these three factors is:

Absolute Bearing = Craft Heading + Relative Bearing
(1) = (2) + (3)

If this equation is not satisfied there will be an error signal generated in winding 34 which will be fed to servo amplifier 36 which will drive directional antenna 10 through motor 13 so as to reduce the error to zero, thereby satisfying the equation. It is seen therefore that indicator 38 will indicate "absolute transmitter bearing."

Thus it is seen that the direction finder means is "slaved", that is, tightly coupled, to the compass 2, thereby having the great advantage of being stabilized in azimuth and not being responsive to erratic conditions which cause momentary direction finder error, such as, static, fading and quadrantal error in turns of the craft. This advantage is obtained without the addition of another gyroscope, the one already in existence for heading reference purposes being utilized without disabling it from its regular compass operation.

Fig. 1A shows an alternate connection arrangement providing electrical coupling between the shaft of directional antenna 10 and Selsyn 33 instead of the present mechanical coupling, that is, shaft 35. This arrangement requires an additional Selsyn 40, and the substitution, for Selsyn 33, of a differential Selsyn 33' having two three phase windings, one of which is connected to new Selsyn 40. An example of this type of differential Selsyn is shown at 130 in the patent to Willard & Hewlett, No. 1,612,118 for Control system for ordnance, dated December 28, 1926. The error signal is taken from the single phase winding of new Selsyn 40. The theory of operation is exactly the same as previously described.

This arrangement has an advantage in that the adapter unit 3 may be located remotely from the direction finder loop but it has the disadvantage of requiring an additional Selsyn, Selsyn 40, which must be mounted on the shaft of directional antenna 10.

The integrating means, i. e., gear train 31, is inserted in the direction finder servo loop in order to average the directional information output and aid in stabilization of the directional means. The motor 30 and the gear train 31 may be designed to have a variable "speed vs. directional error" characteristic. The speed should be proportional to the error, being larger for larger errors, but there should be a definite maximum speed limitation. A speed rate of 3 to 5 degrees per minute for small errors, and from 12 to 20 degrees per minute for larger errors has been found preferable in a specific embodiment.

The adapter unit 3 comprises a few relatively inexpensive items comprising a motor, a gear train, a rotatable transformer and a servo amplifier and the addition of this small amount of equipment greatly enhances the performance of existing equipment in a very simple, efficient and practical manner.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a craft having a compass and an automatic radio direction finder; means to interconnect said compass and said automatic direction finder to thereby stabilize said automatic direction finder in azimuth; and means to gradually correct the orientation of said direction finder relative to the compass proportionally to its average deviation from the direction of received radio energy.

2. In a craft having a directional reference and an automatic direction finder; means to interconnect said directional reference and said automatic direction finder, to thereby stabilize said automatic direction finder in azimuth; and means to gradually correct the orientation of said direction finder relative to the directional reference proportionally to its average deviation from the direction of received radio energy.

3. The combination of a stabilized compass, an automatic radio direction finder; means to interconnect said stabilized compass and said automatic direction finder, to thereby control said automatic direction finder in azimuth, and means to gradually correct said control relative to said stabilized compass proportionally to the average deviation of said direction finder from the direction of received radio energy.

4. In a craft having a compass and directional radio means, means to interconnect said directional reference with said directional radio means comprising a servo amplifier, a rotatable transformer having a three phase winding and a single phase winding both rotatable with respect to its case, said three phase winding being connected to the compass repeater output and said signal phase winding being electrically connected to said servo and mechanically connected to the directional radio means, motor means responsive to said servo amplifier to rotate said directional radio means and means responsive to the output of said directional radio means comprising a gear train having a high step-down gear ratio, the output shaft of which is connected to said three phase winding of said rotatable transformer.

5. In a craft having a directional reference and directional radio means, means for utilizing said directional reference to stabilize said directional radio means in azimuth, and integrating means responsive to the output of said directional radio means to gradually change the orientation of said directional radio means into coincidence with the direction of received energy.

6. In a craft having a directional reference and directional radio means, means comprising a rotatable transformer to slave said directional radio means to said directional reference, and integrating means responsive to the output of said directional radio means to gradually change the orientation of said directional radio means proportionally to its average deviation from the direction of received energy.

7. In a craft having directional reference compass means and an automatic direction finder, means to tightly couple said directional radio means to said directional reference means and averaging means responsive to said direction finder to change the orientation of said directional radio means proportionally to its average deviation from the direction of received energy.

8. The combination of a directional reference and an automatic direction finder, and means to interconnect said first two means comprising a reversible motor responsive to the output of said radio direction finder, integrating means connected to the output shaft of said motor, a rotatable transformer having a three phase rotatable winding connected to the output of said integrating means and having a single phase rotatable winding mechanically connected to the rotatable antenna of said direction finder said three phase winding being electrically connected to the repeater output of said directional reference means, and a servo amplifier connected to said single phase winding and having its output connected to said directional radio means, said radio directional means being responsive to said servo amplifier output to change its direction of receptivity.

9. In a craft having a directional reference and an automatic direction finder, a method of stabilizing said automatic direction finder comprising the steps of tightly coupling said automatic direction finder to said directional reference and gradually changing the direction of said automatic direction finder into coincidence with the direction of received energy in response to signals received by said direction finder.

10. In a craft having a directional gyroscope compass and an automatic direction finder, a method of utilizing said gyroscope to stabilize said direction finder comprising the steps of; tightly coupling said automatic direction finder to said direction reference and gradually changing the direction of said automatic direction finder into coincidence with the direction of received energy in response to signals received by said direction finder.

11. In a craft having a compass and automatic direction finder, a method of stabilizing said direction finder comprising the steps of tightly coupling said direction finder to said compass and gradually changing the direction of received energy in response to signals received by said direction finder.

12. Stabilized radio direction finding apparatus mountable on a craft having a stable directional reference device and a loop antenna that is stabilized at an alterable azimuth angle against turning of the craft, said azimuth angle being altered in accordance with the average displacement of said loop from a null position with respect to impinging radio waves to maintain said loop substantially perpendicular to the transmitter of said waves, comprising a time-averaging mechanism responsive to the waves received by said loop and having an output member whose position is proportional to the absolute transmitter bearing, and loop turning apparatus responsive to the positions of said output member and said directional reference device, whereby said loop is turned to the bearing of the transmitter relative to the craft.

13. Apparatus according to claim 12, wherein the time-averaging mechanism comprises an electric motor having a speed generally proportional to the magnitude of the displacement of the loop from the null position and a direction of rotation dependent upon the sense of the loop displacement, said motor driving the output member through a speed reducing gear train.

14. Apparatus according to claim 12, wherein the loop-turning apparatus includes means for deriving a signal substantially proportional to the difference between the direction of the loop antenna relative to the craft and the combined positions of the output member and the directional reference device, and a servomotor for turning the loop antenna in response to said signal.

EDWARD C. STREETER, Jr.

REFERENCES CITED

The following references are of record in the file of this patent:

UNITED STATES PATENTS

| Number | Name | Date |
| --- | --- | --- |
| 1,958,259 | Becker | May 8, 1942 |
| 2,288,102 | Meredith | June 30, 1942 |